US012057282B2

(12) United States Patent
Yamakawa et al.

(10) Patent No.: US 12,057,282 B2
(45) Date of Patent: Aug. 6, 2024

(54) ELECTROMAGNETIC RELAY

(71) Applicant: Panasonic Intellectual Property Management Co., Ltd., Osaka (JP)

(72) Inventors: Takehiko Yamakawa, Osaka (JP); Kazuyuki Sakiyama, Osaka (JP); Akira Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/112,376

(22) Filed: Feb. 21, 2023

(65) Prior Publication Data

US 2023/0207243 A1 Jun. 29, 2023

Related U.S. Application Data

(62) Division of application No. 17/040,955, filed as application No. PCT/JP2019/006686 on Feb. 22, 2019, now abandoned.

(30) Foreign Application Priority Data

Mar. 23, 2018 (JP) ................................ 2018-057212

(51) Int. Cl.
*H01H 50/54* (2006.01)
*H01H 47/22* (2006.01)
(Continued)

(52) U.S. Cl.
CPC .......... *H01H 50/546* (2013.01); *H01H 47/22* (2013.01); *H01H 50/18* (2013.01); *H01H 50/36* (2013.01); *H01H 50/44* (2013.01)

(58) Field of Classification Search
CPC ....... H01H 50/546; H01H 47/22; H01H 50/44
(Continued)

(56) References Cited

U.S. PATENT DOCUMENTS 3,743,898 A 7/1973 Sturman
4,409,638 A 10/1983 Sturman et al.
(Continued)

FOREIGN PATENT DOCUMENTS

CN 1255722 A 6/2000
CN 102347176 A 2/2012
(Continued)

OTHER PUBLICATIONS

International Search Report issued in corresponding International Patent Application No. PCT/JP2019/006686, dated May 7, 2019, with English translation.

(Continued)

*Primary Examiner* — Alexander Talpalatski
(74) *Attorney, Agent, or Firm* — Rimon P.C.

(57) ABSTRACT

An electromagnetic relay includes a fixed contact, a moving contact, an electromagnet device, and a second coil. The moving contact moves from a closed position where the moving contact is in contact with the fixed contact to an open position where the moving contact is out of contact with the fixed contact, and vice versa. The electromagnet device includes a first coil and a mover. The mover is actuated on receiving a magnetic flux generated when a current flows through the first coil to move the moving contact from one of the closed position or the open position to the other position. The second coil gives, when a current flows through the second coil, at least a magnetic flux, of which a direction is opposite from a direction of the magnetic flux generated by the first coil, to the mover.

3 Claims, 11 Drawing Sheets

(51) Int. Cl.
*H01H 50/18* (2006.01)
*H01H 50/36* (2006.01)
*H01H 50/44* (2006.01)

(58) Field of Classification Search
USPC .................................................. 335/136, 203
See application file for complete search history.

(56) References Cited

U.S. PATENT DOCUMENTS

| | | | | |
|---|---|---|---|---|
| 5,291,170 | A | 3/1994 | Wahba et al. | |
| 5,923,520 | A | 7/1999 | Ikeda et al. | |
| 6,066,999 | A * | 5/2000 | Pischinger | H01F 7/088 335/226 |
| 8,860,537 | B2 * | 10/2014 | Sora | H01H 50/16 335/131 |
| 9,153,370 | B2 | 10/2015 | Uchida | |
| 9,870,888 | B2 * | 1/2018 | Hahn | H01H 50/641 |
| 10,217,586 | B2 | 2/2019 | Hahn et al. | |
| 2013/0093542 | A1 * | 4/2013 | Sora | H01H 47/22 335/192 |
| 2014/0084707 | A1 | 3/2014 | Chen | |

FOREIGN PATENT DOCUMENTS

| | | | |
|---|---|---|---|
| JP | S55-92684 | U | 6/1980 |
| JP | H05-34642 | U | 5/1993 |
| JP | H05-298994 | A | 11/1993 |
| JP | H06-267739 | A | 9/1994 |
| JP | 2014-232668 | A | 12/2014 |
| JP | 2015-170531 | A | 9/2015 |

OTHER PUBLICATIONS

Chinese Office Action dated Nov. 1, 2021, issued in corresponding Chinese Patent Application No. 201980021123.4, with English translation.

Final Office Action issued in U.S. Appl. No. 17/040,955, dated Nov. 22, 2022.

Non-Final Office Action issued in U.S. Appl. No. 17/040,955, dated Aug. 10, 2022.

Final Office Action issued in U.S. Appl. No. 17/040,955, dated Jun. 6, 2022.

Non-Final Office Action issued in U.S. Appl. No. 17/040,955, dated Feb. 24, 2022.

* cited by examiner

ELECTROMAGNETIC RELAY

CROSS-REFERENCE OF RELATED APPLICATIONS

This application is the divisional of U.S. application Ser. No. 17/040,955, filed Sep. 23, 2020, which is the U.S. National Phase under 35 U.S.C. § 371 of International Patent Application No. PCT/JP2019/006686, filed on Feb. 22, 2019, which in turn claims the benefit of Japanese Application No. 2018-057212, filed on Mar. 23, 2018, the entire disclosures of which Applications are incorporated by reference herein.

TECHNICAL FIELD

The present disclosure generally relates to an electromagnetic relay, and more particularly relates to an electromagnetic relay with the ability to turn ON and OFF a pair of contacts.

BACKGROUND ART

Patent Literature 1 discloses an electromagnetic relay for switching the ON/OFF states of a current using a pair of contacts. Specifically, the electromagnetic relay of Patent Literature 1 causes a moving iron core (mover) to move with electromagnetic force generated by energizing an excitation coil (first coil) of an electromagnet device, thereby moving a moving contactor that a contact device includes. This brings a moving contact of the moving contactor into contact with a fixed contact of a fixed terminal that the contact device includes to connect the fixed terminal and the moving contactor together.

In the electromagnetic relay of Patent Literature 1, the mover is placed in a magnetic field generated by energizing the first coil. Thus, even when the first coil is no longer energized (i.e., no longer has magnetic field), the mover may still remain magnetized (i.e., may have remanent magnetization).

CITATION LIST

Patent Literature

Patent Literature 1: JP 2014-232668 A

SUMMARY OF INVENTION

It is therefore an object of the present disclosure to provide an electromagnetic relay with the ability to reduce the remanent magnetization of the mover.

An electromagnetic relay according to an aspect of the present disclosure includes a fixed contact, a moving contact, an electromagnet device, and a second coil. The moving contact moves from a closed position where the moving contact is in contact with the fixed contact to an open position where the moving contact is out of contact with the fixed contact, and vice versa. The electromagnet device includes a first coil and a mover. The mover is actuated on receiving a magnetic flux generated when a current flows through the first coil to move the moving contact from one of the closed position or the open position to the other position. The second coil gives, when a current flows through the second coil, at least a magnetic flux, of which a direction is opposite from a direction of the magnetic flux generated by the first coil, to the mover.

DESCRIPTION OF EMBODIMENTS

Note that embodiments and their variations to be described below are only examples of the present disclosure and should not be construed as limiting. Rather, those embodiments and variations may be readily modified in various manners depending on a design choice or any other factor without departing from a true spirit and scope of the present disclosure. It should also be noted that the drawings to be referred to in the following description of embodiments and their variations are all schematic representations. That is to say, the ratio of the dimensions (including thicknesses) of respective constituent elements illustrated on the drawings does not always reflect their actual dimensional ratio.

(1) Configuration (1.1) Electromagnetic Relay

Figure 1:
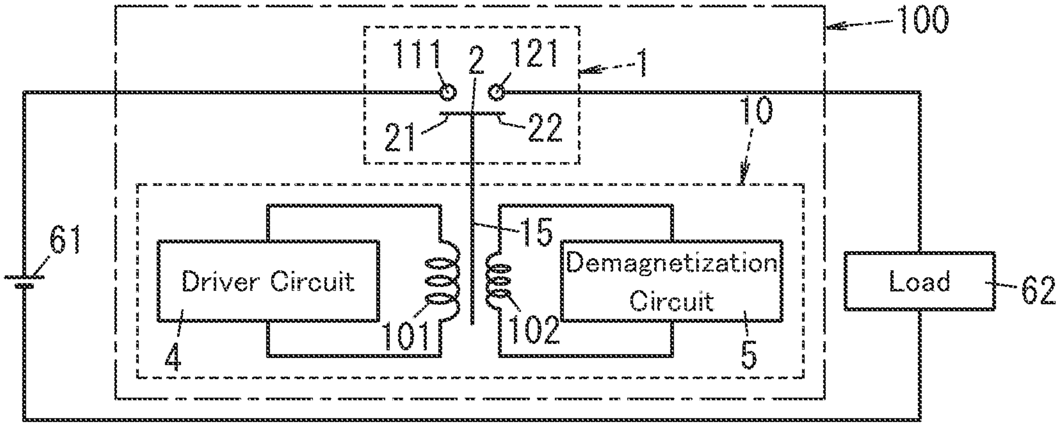
FIG. 1 illustrates a schematic configuration for an electromagnetic relay according to an exemplary embodiment of the present disclosure.
Figure 2:
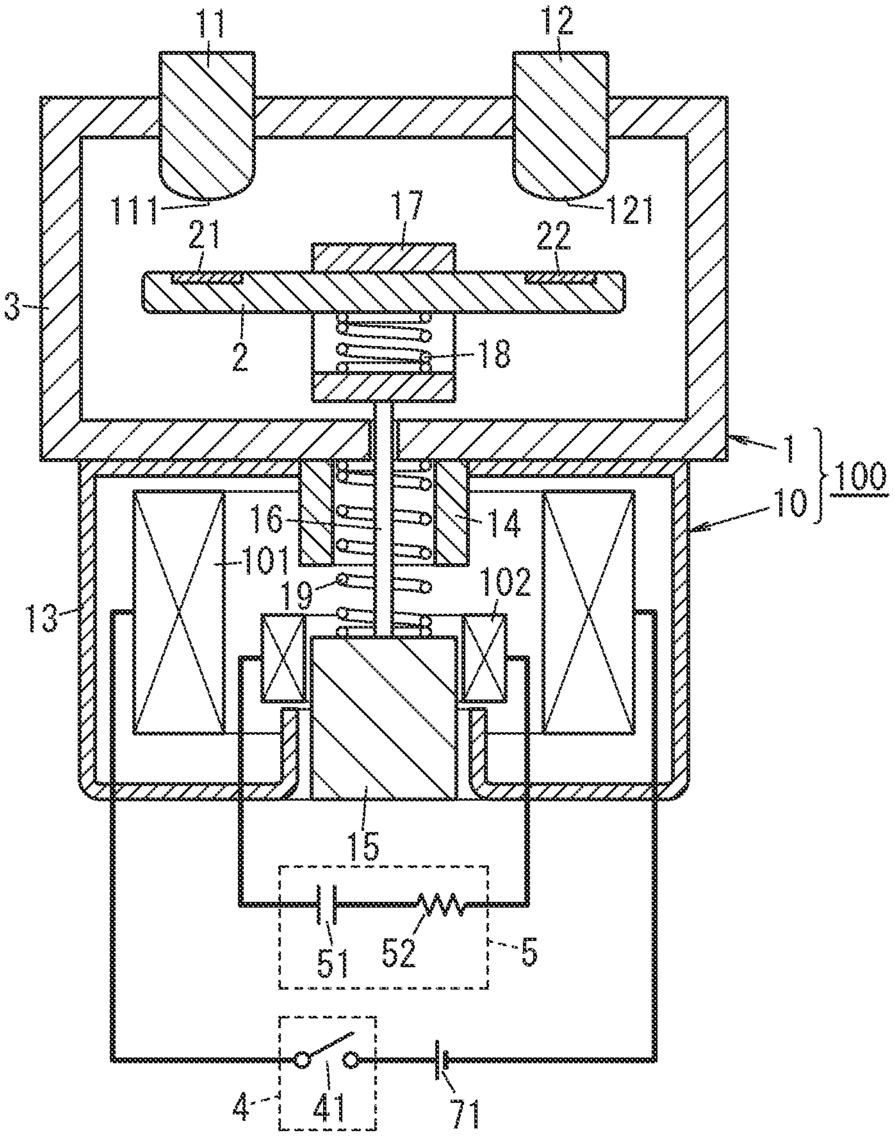
FIG. 2 is a cross-sectional view illustrating an OFF state of the electromagnetic relay.

An electromagnetic relay 100 according to an exemplary embodiment includes a contact device 1 and an electromagnet device 10 as shown in FIGS. 1 and 2. The contact device 1 includes a pair of fixed terminals 11, 12 and a moving contactor 2. The fixed terminals 11, 12 respectively hold fixed contacts 111, 121 thereon. The moving contactor 2 holds a pair of moving contacts 21, 22 thereon.

The electromagnet device 10 includes a first coil 101 and a mover 15. The electromagnet device 10 is configured to have the mover 15 attracted by a magnetic field generated by the first coil 101 when the first coil 101 is energized. Attracting the mover 15 causes the moving contacts 21, 22 held by the moving contactor 2 to move from an open position to a closed position. As used herein, the "open position" refers to the position of the moving contacts 21, 22 when the moving contacts 21, 22 go out of contact with the fixed contacts 111, 121, respectively. Also, as used herein, the "closed position" refers to the position of the moving contacts 21, 22 when the moving contacts 21, 22 come into contact with the fixed contacts 111, 121, respectively. That is to say, the moving contacts 21, 22 move from the closed position to the open position, and vice versa.

In the embodiment to be described below, the electromagnetic relay 100 is supposed to be used as a part of onboard equipment for an electric vehicle. In that case, the contact device 1 (fixed terminals 11, 12) is electrically connected on a path along which DC power is supplied from a traveling battery 61 to a load (such as an inverter) 62.

(1.2) Contact Device

Next, a configuration for the contact device 1 will be described.

As shown in FIGS. 1 and 2, the contact device 1 includes the pair of fixed terminals 11, 12, the moving contactor 2, and a container 3. The fixed terminal 11 holds the fixed contact 111 thereon, and the fixed terminal 12 holds the fixed contact 121 thereon. The moving contactor 2 is a plate member made of a metallic material with electrical conductivity. The moving contactor 2 holds a pair of moving contacts 21, 22, which are arranged to face the pair of fixed contacts 111, 121, respectively.

In the following description, the direction in which the fixed contacts 111, 121 and the moving contacts 21, 22 face each other is defined herein to be an upward/downward direction, and the fixed contacts 111, 121 are located on an upper side when viewed from the moving contacts 21, 22, just for the sake of convenience. In addition, the direction in which the pair of fixed terminals 11, 12 (i.e., the pair of fixed contact 111, 121) are arranged side by side is defined herein to be a rightward/leftward direction, and the fixed terminal 12 is supposed to be located on the right when viewed from the fixed terminal 11. That is to say, in the following description, the upward, downward, rightward, and leftward directions are supposed to be defined on the basis of the directions shown in FIG. 2. Furthermore, in the following description, the direction perpendicular to both the upward/downward direction and the rightward/leftward direction (i.e., the direction coming out of the paper on which FIG. 2 is depicted) is defined herein to be a forward/backward direction. Note that these directions should not be construed as limiting a mode of using the electromagnetic relay 100.

One (first) fixed contact 111 is held at the bottom of one (first) fixed terminal 11, while the other (second) fixed contact 121 is held at the bottom of the other (second) fixed terminal 12.

The pair of fixed terminals 11, 12 are arranged side by side in the rightward/leftward direction. Each of the pair of fixed terminals 11, 12 is made of an electrically conductive metallic material. The pair of fixed terminals 11, 12 serves as terminals for connecting an external circuit (including the battery 61 and the load 62) to the pair of fixed contacts 111, 121. In this embodiment, the fixed terminals 11, 12 are supposed to be made of copper (Cu), for example. However, this is only an example and should not be construed as limiting. Alternatively, the fixed terminals 11, 12 may also be made of any electrically conductive material other than copper.

Each of the pair of fixed terminals 11, 12 is formed in the shape of a cylinder, of which a cross section, taken along a plane intersecting with the upward/downward direction at right angles, is circular. The pair of fixed terminals 11, 12 are each held by the container 3 such that part of the fixed terminal 11, 12 protrudes from the upper surface of the container 3. Specifically, each of the pair of fixed terminals 11, 12 is fixed onto the container 3 so as to run through an opening cut through the upper wall of the container 3.

The moving contactor 2 is formed in the shape of a plate having thickness in the upward/downward direction and having a greater dimension in the rightward/leftward direction than in the forward/backward direction. The moving contactor 2 is arranged under the pair of fixed terminals 11, 12 such that both longitudinal ends thereof (i.e., both ends thereof in the rightward/leftward direction) face the pair of fixed contacts 111, 121, respectively. Portions, respectively facing the pair of fixed contacts 111, 121, of the moving contactor 2 are provided with the pair of moving contacts 21, 22, respectively.

Figure 3:
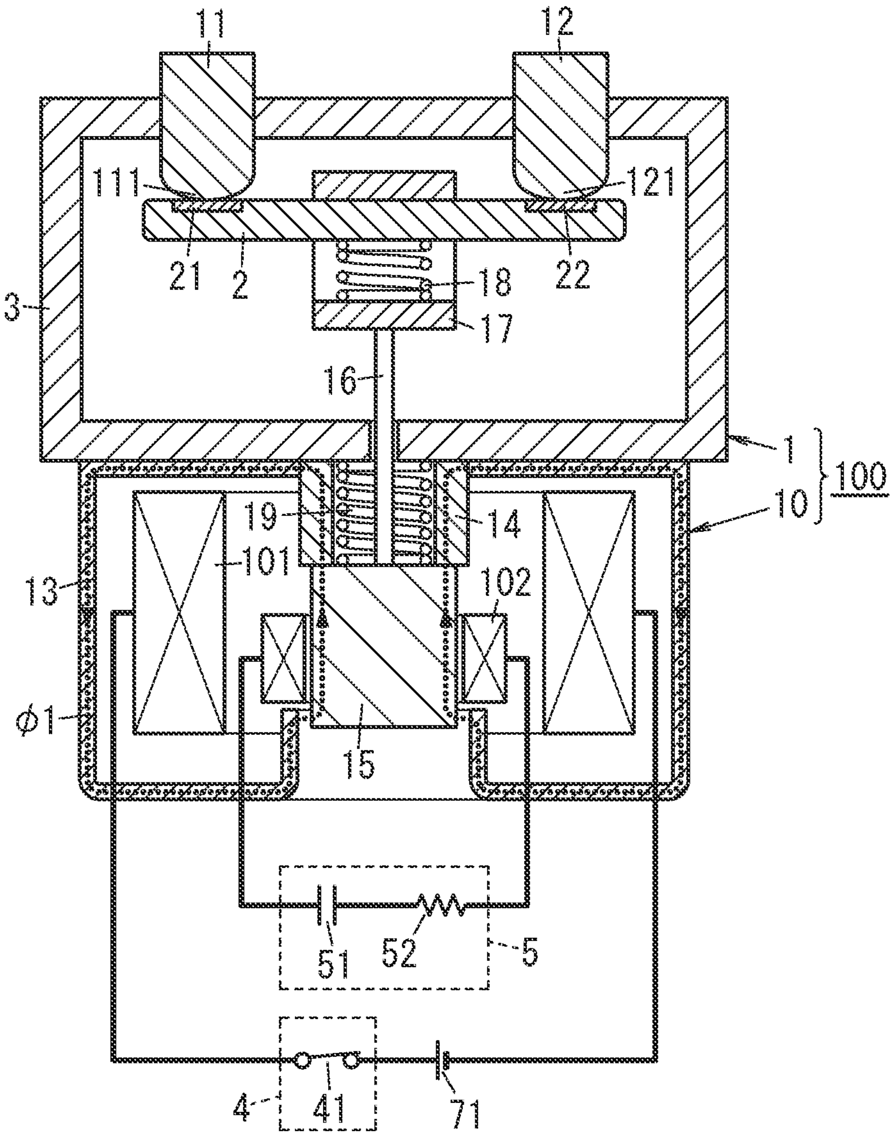
FIG. 3 is a cross-sectional view illustrating an ON state of the electromagnetic relay.

The moving contactor 2 is housed in the container 3. The moving contactor 2 is moved up and down (i.e., in the upward/downward direction) by the electromagnet device 10 arranged under the container 3, thus allowing the moving contacts 21, 22 held by the moving contactor 2 to move from the closed position to the open position, and vice versa. FIG. 2 illustrates a state where the moving contacts 21, 22 are currently located at the open position. In this state, the pair of moving contacts 21, 22 held by the moving contactor 2 are out of contact with their associated fixed contacts 111, 121, respectively. FIG. 3 illustrates a state where the moving contacts 21, 22 are currently located at the closed position. In this state, the pair of moving contacts 21, 22 held by the moving contactor 2 are in contact with their associated fixed contacts 111, 121, respectively.

Therefore, when the moving contacts 21, 22 are currently located at the closed position, the pair of fixed terminals 11, 12 are short-circuited together via the moving contactor 2. That is to say, when the moving contacts 21, 22 are currently located at the closed position, the moving contacts 21, 22 come into contact with the fixed contacts 111, 121, respectively, and therefore, the fixed terminal 11 is electrically connected to the fixed terminal 12 via the fixed contact 111, the moving contact 21, the moving contactor 2, the moving contact 22, and the fixed contact 121. Thus, if the fixed terminal 11 is electrically connected to one member selected from the group consisting of the battery 61 and the load 62 and the fixed terminal 12 is electrically connected to the other member, the contact device 1 forms a path along which DC power is supplied from the battery 61 to the load 62 while the moving contacts 21, 22 are located at the closed position. On the other hand, while the moving contacts 21, 22 are located at the open position, the pair of fixed terminals 11, 12 are opened.

In this embodiment, the moving contacts 21, 22 only need to be held by the moving contactor 2. Therefore, the moving contacts 21, 22 may be formed by hammering out portions of the moving contactor 2, for example, so as to form integral parts of the moving contactor 2. Alternatively, the moving contacts 21, 22 may be members provided separately from the moving contactor 2 and may be secured, by welding, for example, onto the moving contactor 2. Likewise, the fixed contacts 111, 121 only need to be held by the fixed terminals 11, 12, respectively. Therefore, the fixed contacts 111, 121 may form integral parts of the fixed terminals 11, 12, respectively. Alternatively, the fixed contacts 111, 121 may be members provided separately from the fixed terminals 11, 12 and may be secured, by welding, for example, onto the fixed terminals 11, 12, respectively.

The container 3 houses the pair of fixed contacts 111, 121 and the moving contactor 2. The container 3 only needs to be formed in the shape of a box that houses the pair of fixed contacts 111, 121 and the moving contactor 2. Thus, the container 3 does not have to be formed in the shape of a hollow rectangular parallelepiped as in this embodiment but may also be formed in the shape of a hollow elliptic cylinder or a hollow polygonal column, for example. That is to say, as used herein, the "box shape" refers to any shape in general which has a space to house the pair of fixed contacts 111, 121 and the moving contactor 2 inside, and therefore, does not have to be a rectangular parallelepiped shape. The container 3 is formed by joining together a housing, a flange, and an upper plate of a yoke 13 of the electromagnet device 10 to be described later. In FIG. 2, the structure of the electromagnet device 100 is illustrated in a simplified form and illustration of the housing, the flange, and the upper plate of the yoke 13 is omitted. The same statement applies to FIGS. 3, 7, 8, 10, and 11 as well.

The housing may be made of a ceramic material such as aluminum oxide (alumina). The housing is formed in the shape of a hollow rectangular parallelepiped, of which the dimension is greater in the rightward/leftward direction than in the forward/backward direction. The lower surface of the housing is open. The upper surface of the housing has a pair of openings to pass the pair of fixed terminals 11, 12 therethrough. The pair of openings may be formed in a circular shape, for example, and runs through the upper wall of the housing along the thickness thereof (i.e., in the upward/downward direction). The fixed terminal 11 is passed through one opening and the fixed terminal 12 is passed through the other opening. The pair of fixed terminals 11, 12 and the housing are joined together by brazing, for example. Furthermore, the housing does not have to be made of a ceramic material but may also be made of an electrical insulating material such as glass or resin or may even be made of a metallic material. In any case, the housing is suitably made of a non-magnetic material so as not to be magnetized with magnetism and turn into a magnetic body.

The flange is made of a non-magnetic metallic material, which may be an austenitic stainless steel such as SUS304. The flange may be formed in the shape of a hollow rectangular parallelepiped elongated in the rightward/leftward direction. The upper and lower surfaces of the flange are open. The flange is arranged between the housing and the electromagnet device 10. The flange is hermetically bonded to the housing and the upper plate of the yoke 13. This turns the internal space, surrounded with the housing, the flange, and the upper plate of the yoke 13, of the contact device 1 into a hermetically sealed space. The flange does not have to be made of a non-magnetic material but may also be made of an alloy, such as 42 alloy, including iron as a main component.

(1.3) Electromagnet Device

Next, a configuration for the electromagnet device 10 will be described.

The electromagnet device 10 is arranged under the moving contactor 2 as shown in FIGS. 1 and 2. The electromagnet device 10 includes a first coil 101, a second coil 102, a stator 14, and a mover 15. That is to say, in this embodiment, the second coil 102 is provided separately from the first coil 101. When the first coil 101 is energized, the electromagnet device 10 has the mover 15 attracted toward the stator 14 by a magnetic field generated by the first coil 101, thereby moving the mover 15 upward.

In this embodiment, the electromagnet device 10 includes not only the first coil 101, the second coil 102, the stator 14, and the mover 15 but also a yoke 13, a shaft 16, a holder 17, a contact pressure spring 18, and a return spring 19 as well. The electromagnet device 10 further includes a cylindrical body and a coil bobbin. Note that the structure of the electromagnet device 10 is illustrated in a simplified form in FIG. 2 and illustration of the cylindrical body and the coil bobbin is omitted from FIG. 2. The same statement applies to FIGS. 3, 7, 8, 10, and 11 as well.

The stator 14 is a fixed iron core formed in the shape of a cylinder protruding downward from a central region of the lower surface of the upper plate of the yoke 13 (from the bottom wall of the container 3 on the drawings). The upper end portion of the stator 14 is secured to the upper plate of the yoke 13.

The mover 15 is a moving iron core also formed in the shape of a cylinder. The mover 15 is arranged under the stator 14 such that the upper end face of the mover 15 faces the lower end face of the stator 14. The mover 15 is configured to be movable in the upward/downward direction. Specifically, the mover 15 moves back and forth between a first position where the upper end face thereof is out of contact with the lower end face of the stator 14 (see FIG. 2) and a second position where the upper end face thereof is in contact with the lower end face of the stator 14 (see FIG. 3).

The first coil 101 is arranged under the container 3 such that its center axis is aligned with the upward/downward direction. The stator 14 and the mover 15 are arranged inside the first coil 101. One end of the first coil 101 is electrically connected to a first switch 41 and the other end of the first coil 101 is electrically connected to a DC power supply 71. The first coil 101 is formed by winding an electrically conductive wire around a coil bobbin made of a synthetic resin. The DC power supply 71 may have any configuration for supplying a DC current to the first coil 101 and may include a DC/DC converter circuit or an AC/DC converter circuit, for example.

In this embodiment, the first switch 41 forms part of a driver circuit 4 for driving the first coil 101. The first switch 41 is controlled by an external circuit to have its ON/OFF states switched, thereby opening and closing an electrical path connecting the first coil 101 to the DC power supply 71. Specifically, when the first switch 41 is in ON state, a direct current flows from the DC power supply 71 into the first coil 101, thereby energizing the first coil 101 (i.e., driving the first coil 101). On the other hand, when the first switch 41 is in OFF state, the supply of the direct current from the DC power supply 71 to the first coil 101 is suspended, thereby canceling the energized state of the first coil 101.

The second coil 102 is arranged inside the first coil 101 such that its center axis is aligned with the upward/downward direction. The mover 15 is arranged inside the second coil 102. A demagnetization circuit 5 is electrically connected to both ends of the second coil 102. The second coil 102 is formed by winding an electrically conductive wire around a coil bobbin made of a synthetic resin. Note that the coil bobbin for the first coil 101 and the coil bobbin for the second coil 102 are different from each other.

The demagnetization circuit 5 is implemented as a series circuit of a capacitor 51 and a resistor 52. The capacitor 51 and the resistor 52 form, along with the second coil 102, a series resonant circuit. In other words, the demagnetization circuit 5 includes the capacitor 51 that forms, along with the second coil 102, a resonant circuit. In this embodiment, an alternating current is allowed to flow through the second coil 102 by utilizing the resonance between the second coil 102 and the demagnetization circuit 5 (including the capacitor 51 and the resistor 52). That is to say, the demagnetization circuit 5 supplies the alternating current to the second coil 102. The operation of the demagnetization circuit 5 will be described in detail later in the "(2.2) Demagnetization operation" section.

The yoke 13 is arranged to surround the first coil 101. The yoke 13 forms, along with the stator 14 and the mover 15, a magnetic circuit, through which a magnetic flux φ1 (see FIG. 3), produced when the first coil 101 is energized, passes. In other words, the magnetic flux φ1 generated by the first coil 101 passes through the yoke 13. Thus, the yoke 13, the stator 14, and the mover 15 are all made of a magnetic material (such as a ferromagnetic body). As described above, the upper plate of the yoke 13 forms part of the bottom wall of the container 3.

The shaft 16 is made of a non-magnetic material. The shaft 16 is formed in the shape of a round rod extending in the upward/downward direction. The shaft 16 transmits the driving force, generated by the electromagnet device 10, to the contact device 1 provided over the electromagnet device 10. The shaft 16 passes through the inside of the contact pressure spring 18, a through hole provided through a central region of the upper plate of the yoke 13, the inside of the stator 14, and the inside of the return spring 19 to have the lower end thereof fixed onto the mover 15. The holder 17 is fixed at the upper end of the shaft 16.

The holder 17 has the shape of a rectangular cylinder, of which the right and left surfaces are both open. The holder 17 is combined with the moving contactor 2 such that the moving contactor 2 runs through the holder 17 in the rightward/leftward direction. The contact pressure spring 18 is arranged between the bottom wall of the holder 17 and the moving contactor 2. That is to say, a middle portion in the rightward/leftward direction of the moving contactor 2 is held by the holder 17. An upper end portion of the shaft 16 is fixed onto the holder 17. When the first coil 101 is energized, the shaft 16 is pushed upward as the mover 15 moves upward. Thus, the holder 17 also moves upward. As a result of this movement, the moving contactor 2 moves upward to bring the pair of moving contacts 21, 22 to the closed position where the pair of moving contacts 21, 22 are in contact with the pair of fixed contacts 111, 121, respectively.

The contact pressure spring 18 is arranged between the lower surface of the moving contactor 2 and the upper surface of the bottom wall of the holder 17. The contact pressure spring 18 is a coil spring that biases the moving contactor 2 upward. One end of the contact pressure spring 18 is connected to the lower surface of the moving contactor 2, while the other end of the contact pressure spring 18 is connected to the upper surface of the bottom wall of the holder 17.

At least part of the return spring 19 is arranged inside the stator 14. The return spring 19 is a coil spring that biases the mover 15 downward (toward the first position). One end of the return spring 19 is connected to the upper end face of the mover 15 and the other end of the return spring 19 is connected to the upper plate of the yoke 13.

The cylindrical body is formed in the shape of a bottomed cylinder with an open upper surface. The upper end portion of the cylindrical body is bonded onto the lower surface of the upper plate of the yoke 13. This allows the cylindrical body to restrict the direction of movement of the mover 15 to the upward/downward direction and also define the first position of the mover 15. The cylindrical body is hermetically bonded onto the lower surface of the upper plate of the yoke 13. This allows, even when a through hole is provided through the upper plate of the yoke 13, the internal space, surrounded with the housing, the flange, and the upper plate of the yoke 13, of the contact device 1 to be kept sealed hermetically.

(2) Operation

Next, it will be described briefly how the electromagnetic relay 100 according to this embodiment operates.

(2.1) Basic Operation

First, a basic operation of the electromagnetic relay 100 will be described. While the first switch 14 is in OFF state and the first coil 101 is supplied with no electric current (i.e., not energized), no magnetic attractive force is generated between the mover 15 and the stator 14. Thus, in such a situation, the mover 15 is located at the first position under the spring force applied by the return spring 19. At this time, the shaft 16 and the holder 17 have been pulled down to restrict the upward movement of the moving contactor 2. This causes the pair of moving contacts 21, 22 held by the moving contactor 2 to be located at the open position, which is the lower end position of their movable range. This brings the pair of moving contacts 21, 22 out of contact with the pair of fixed contacts 111, 121, respectively, thus turning the contact device 1 open. In this state, the pair of fixed terminals 11, 12 are electrically nonconductive with each other.

On the other hand, when the first switch 41 is turned ON by an external circuit, a direct current is supplied from the DC power supply 71 to the first coil 101. Thus, when the first coil 101 is energized (i.e., supplied with an electric current), magnetic attractive force is generated between the mover 15 and the stator 14, thus causing the mover 15 to be pulled upward by overcoming the spring force applied by the return spring 19 to reach the second position. At this time, the shaft 16 and the holder 17 are pushed upward, thus lifting the restriction imposed by the shaft 16 and the holder 17 against the upward movement of the moving contactor 2. Then, the contact pressure spring 18 biases the moving contactor 2 upward, thus causing the moving contacts 21, 22 held by the moving contactor 2 to move toward the closed position at the upper end of their movable range. This brings the pair of moving contacts 21, 22 into contact with the pair of fixed contacts 111, 121, respectively, thus turning the contact device 1 closed. In this state, the contact device 1 is closed, and therefore, the pair of fixed terminals 11, 12 are electrically conductive with each other. In this state, power is supplied from the battery 61 to the load 62.

Next, when power stops being supplied from the battery 61 to the load 62 due to an excessive amount of current flowing through the load 62 and its surrounding parts, for example, the external circuit turns the first switch 41 OFF. Then, the supply of a direct current from the DC power supply 71 to the first coil 101 is suspended, thus making the first coil 101 electrically nonconductive. In that case, the pair of moving contacts 21, 22 goes out of contact with the pair of fixed contacts 111, 121, respectively, as described above, thus turning the contact device 1 open. In this state, the pair of fixed terminals 11, 12 becomes electrically nonconductive with each other, thus suspending the supply of power from the battery 61 to the load 62.

This allows the electromagnet device 10 to control the magnetic attractive force to be applied onto the mover 15 by selectively energizing the first coil 101 and to generate driving force for switching the state of the contact device 1 from the open state to the closed state, and vice versa, by moving the mover 15 up and down in the upward/downward direction. In other words, the mover 15 is actuated on receiving the magnetic flux φ1 (see FIG. 3) generated when a current flows through the first coil 101, thus moving the moving contacts 21, 22 from one of the closed position or the open position (e.g., the open position in this example) to the other position (e.g., the closed position in this example).

(2.2) Demagnetization Operation

Figure 4:
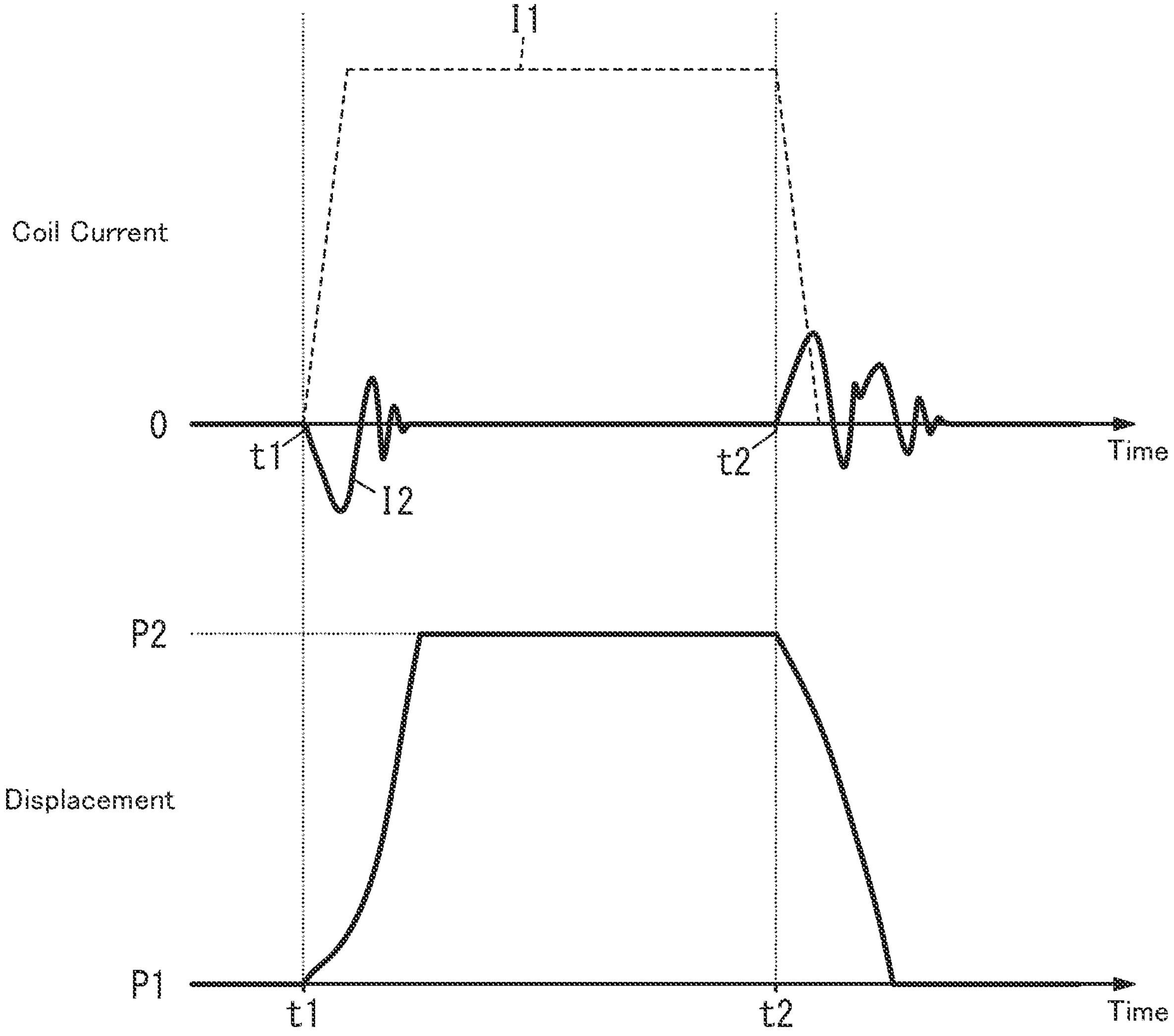
FIG. 4 illustrates how the electromagnetic relay operates.

Next, a demagnetization operation using the second coil 102 will be described with reference to FIG. 4. In FIG. 4, the "coil current" indicates the amounts of currents flowing through the first coil 101 and the second coil 102. Specifically, the dotted line shown in FIG. 4 indicates the amount of current I1 flowing through the first coil 101 (hereinafter referred to as a "first current"), while the solid line shown in FIG. 4 indicates the amount of current I2 flowing through the second coil 102 (hereinafter referred to as a "second current"). The same statement also applies to FIG. 9 to be referred to later. Also, in FIG. 4, "displacement" indicates the displacement of the mover 15. Specifically, in FIG. 4, P1 indicates that the mover 15 is located at the first position and P2 indicates that the mover 15 is located at the second position.

First, at a time t1, when the first switch 41 turns ON to energize the first coil 101, the first current I1 flows through the first coil 101. Thus, the magnetic flux φ1 generated by the first coil 101 produces magnetic attractive force between the mover 15 and the stator 14 to cause the mover 15 to move from the first position to the second position. At this time, the magnetic flux φ1 generated by the first coil 101 is interlinked with the second coil 102 provided inside the yoke 13, thus causing an induced current (second current) 12 to flow through the second coil 102. In this case, the second current I2 is so much smaller than the first current I1 that the magnetic repulsion produced by the second current I2 hardly affects the upward movement of the mover 15.

Next, at a time t2, the first switch 41 turns OFF to cancel the energized state of the first coil 101. Then, the supply of the first current I1 to the first coil 101 is suspended. This causes the first coil 101 to stop generating the magnetic flux φ1. Thus, the magnetic attractive force between the mover 15 and the stator 14 is lost. As a result, the mover 15 moves from the second position to the first position under the spring force applied by the return spring 19.

With this regard, the mover 15 is magnetized by receiving the magnetic flux φ1 generated by the first coil 101. However, even when the energized state of the first coil 101 is canceled after that, the mover 15 may still be magnetized in some cases. In the following description, the mover 15 is supposed to be have remanent magnetization when the energize state of the first coil 101 is canceled.

When the first coil 101 stops generating the magnetic flux φ1 at the time t2, the magnetic flux φ1 interlinked with the second coil 102 changes, thus causing the induced current (second current) 12 to flow through the second coil 102. Also, as the mover 15 starts returning from the second position toward the first position at the time t2, the mover 15 with the remanent magnetization moves inside the second coil 102, thus causing the induced current (second current) 12 to flow through the second coil 102. Then, resonance is produced between the second coil 102 and the demagnetization circuit 5 (including the capacitor 51 and the resistor 52) to cause an alternating current to flow through the second coil 102. The alternating current flowing through the second coil 102 induces the second coil 102 to alternately generate a magnetic flux having the same direction as the magnetic flux φ1 generated by the first coil 101 and a magnetic flux having the opposite direction from the magnetic flux φ1. In other words, when the current flows through the second coil 102, the second coil 102 gives at least a magnetic flux, of which the direction is opposite from that of the magnetic flux φ1 generated by the first coil 101, to the mover 15.

As can be seen, the mover 15 is placed in a magnetic field generated by the alternating current flowing through the second coil 102 which has a direction that changes cyclically. Therefore, the remanent magnetization of the mover 15 decreases with the passage of time. The strength of the magnetic field generated by the second coil 102 also decreases with time, as the electrical energy is consumed by the resistor 52.

Next, the advantages of the electromagnetic relay 100 according to this embodiment over an electromagnetic relay as a comparative example will be described. The electromagnetic relay according to the comparative example includes no second coil 102 or demagnetization circuit 5, which is a major difference from the electromagnetic relay 100 according to this embodiment.

Figure 5:
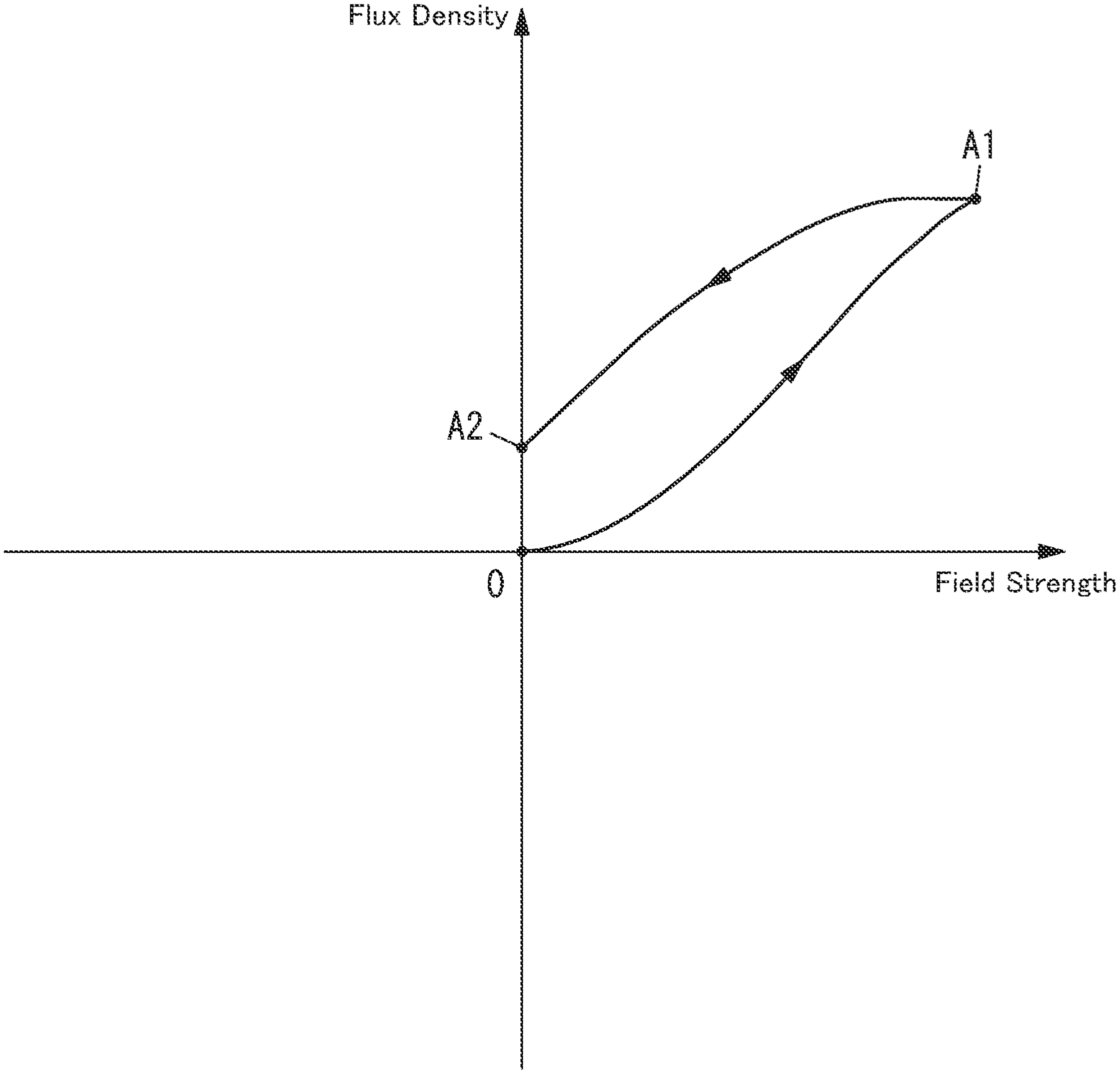
FIG. 5 shows the magnetic properties of a mover in an electromagnetic relay according to a comparative example.

In the electromagnetic relay according to the comparative example, the mover may exhibit the magnetic properties shown in FIG. 5, for example. In FIG. 5, the ordinate indicates the flux density of the magnetic flux passing through the mover, while the abscissa indicates the strength of the magnetic field in which the mover is placed. In the electromagnetic relay according to the comparative example, when placed in a magnetic field generated when the first coil is energized, the mover is magnetized (see the state A1 shown in FIG. 5). Thereafter, when the energized state of the first coil is canceled, the magnetic field strength goes zero again but magnetization remains in the mover (see the state A2 shown in FIG. 5). While the mover has such remanent magnetization, the mover tends to be attracted toward the stator easily, thus taking a long time to perform the operation of opening and closing the contact device (e.g., the operation of moving the pair of moving contacts from the closed position to the open position in this case). That is to say, in the electromagnetic relay according to the comparative example, the remanent magnetization of the mover increases the chances of causing a decline in the responsivity of the opening/closing operation of the contact device.

Figure 6:
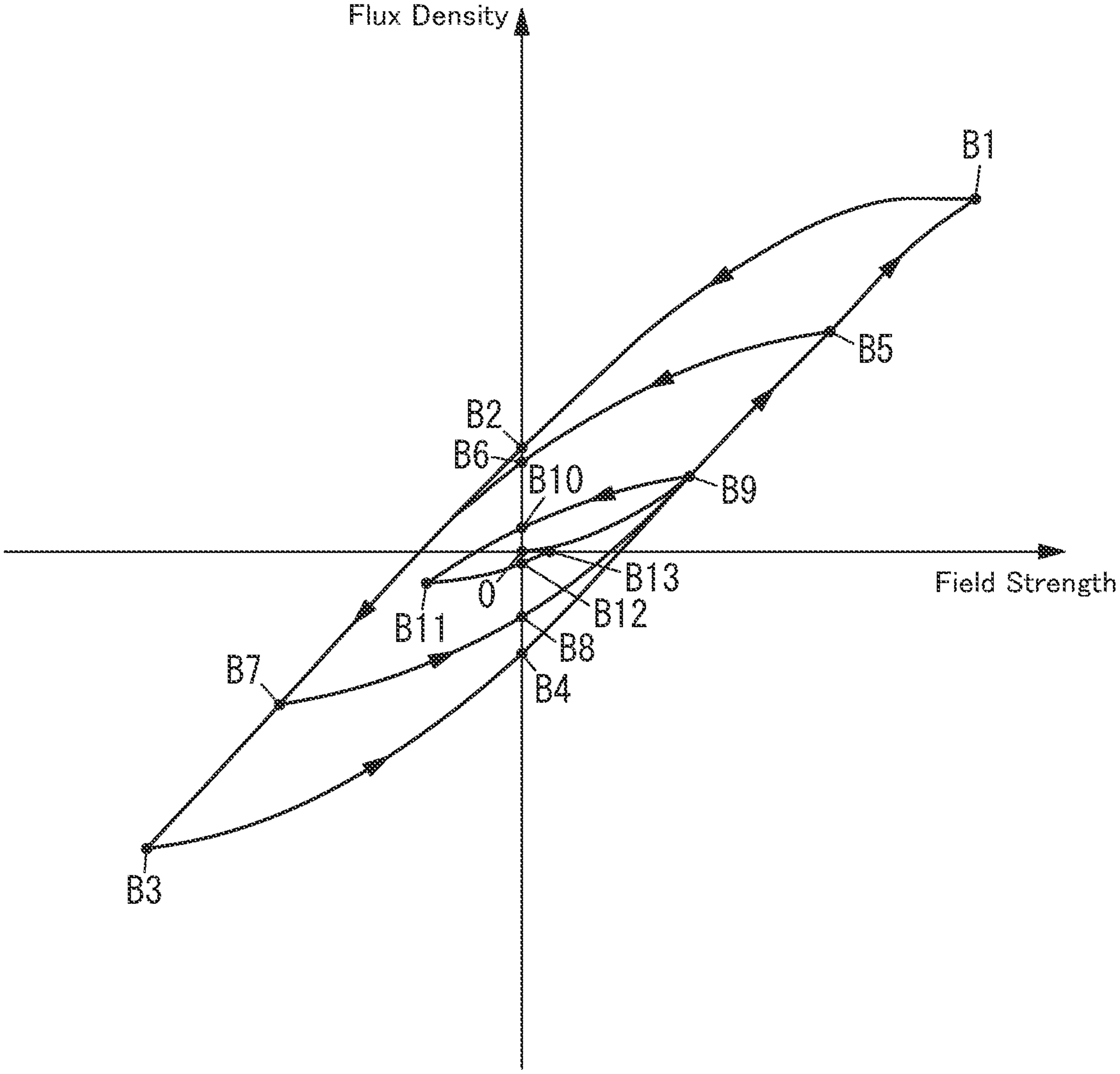
FIG. 6 shows the magnetic properties of a mover in an electromagnetic relay according to the exemplary embodiment of the present disclosure.

In contrast, in the electromagnetic relay 100 according to this embodiment, the mover 15 may exhibit the magnetic properties shown in FIG. 6, for example. In FIG. 6, the ordinate indicates the flux density of the magnetic flux passing through the mover 15, while the abscissa indicates the strength of the magnetic field in which the mover 15 is placed. Also, in the first and fourth quadrants shown in FIG. 6, the direction of the magnetic field where the mover 15 is placed is the same as the direction of the magnetic flux φ1 generated by the first coil 101 which passes through the mover 15 (hereinafter referred to as a "first direction"). In the second and third quadrants, the direction of the magnetic field where the mover 15 is placed is opposite from the first direction (and will be hereinafter referred to as a "second direction").

As in the electromagnetic relay according to the comparative example, when placed in the magnetic field generated by energizing the first coil 101, the mover 15 of the electromagnetic relay 100 according to this embodiment is also magnetized (see the state B1 shown in FIG. 6). Thereafter, when the energized state of the first coil 101 is canceled, the magnetic field strength goes zero again but magnetization remains in the mover 15 (see the state B2 shown in FIG. 6). In the electromagnetic relay 100 according to this embodiment, however, an alternating current flows through the second coil 102 after the state B2, thus alternately placing the mover 15 in a magnetic field with the first direction and a magnetic field with the second direction. This causes the mover 15 to make a state transition from the state B2 to the state B3, the state B4, . . . and then the state B13 in this order with the passage of time as shown in FIG. 6. Thus, the remanent magnetization of the mover 15 decreases with the passage of time.

As can be seen from the foregoing description, the electromagnetic relay 100 according to this embodiment achieves the advantage of reducing the remanent magnetization of the mover 15 by placing the mover 15 in the magnetic field generated by the second coil 102. This allows the electromagnetic relay 100 according to this embodiment to achieve the advantage of reducing the chances of the mover 15 having remanent magnetization that would cause a decline in the responsivity in the opening and closing operations of the contact device 1, compared to the electromagnetic relay according to the comparative example.

(3) Variations

Next, first to third variations of the exemplary embodiment described above will be enumerated one after another. Note that any of the variations to be described below may be adopted in combination with the exemplary embodiment as appropriate.

(3.1) First Variation

Figure 7:
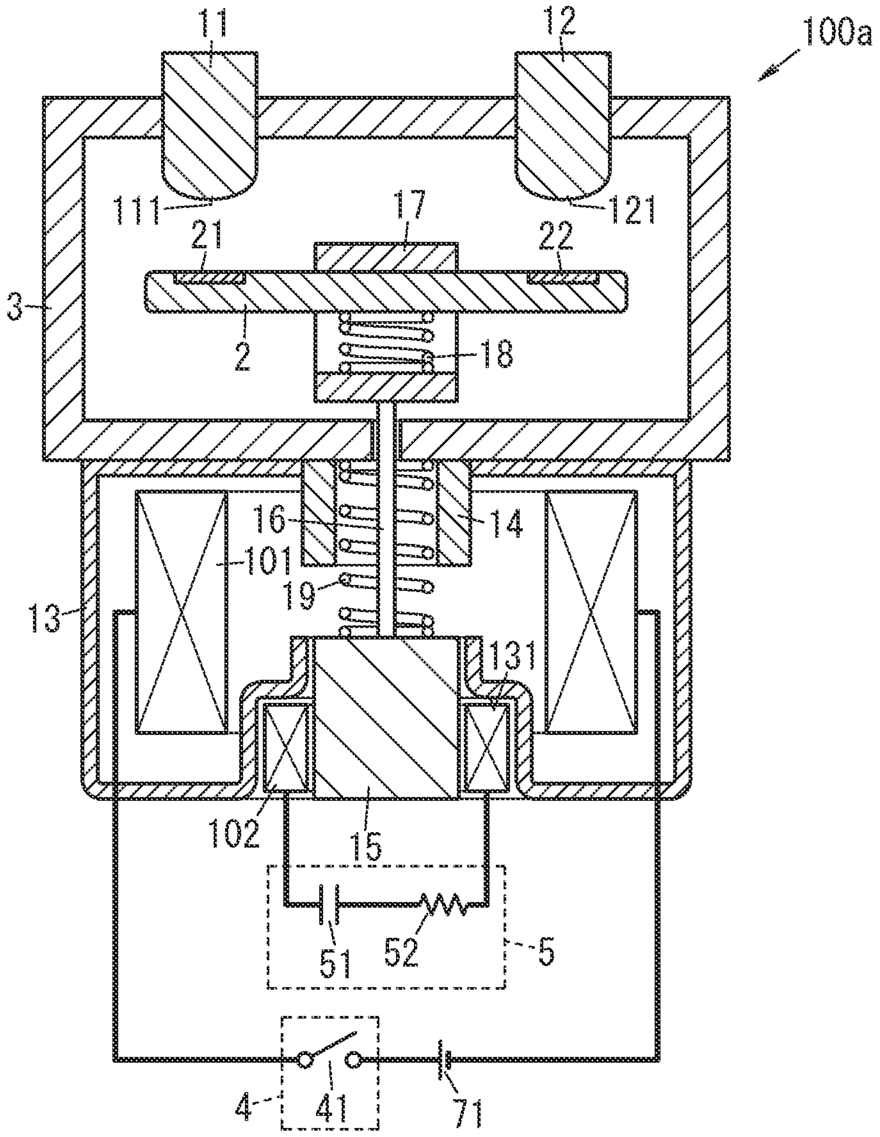
FIG. 7 is a cross-sectional view illustrating an OFF state of an electromagnetic relay according to a first variation of the exemplary embodiment of the present disclosure.
Figure 8:
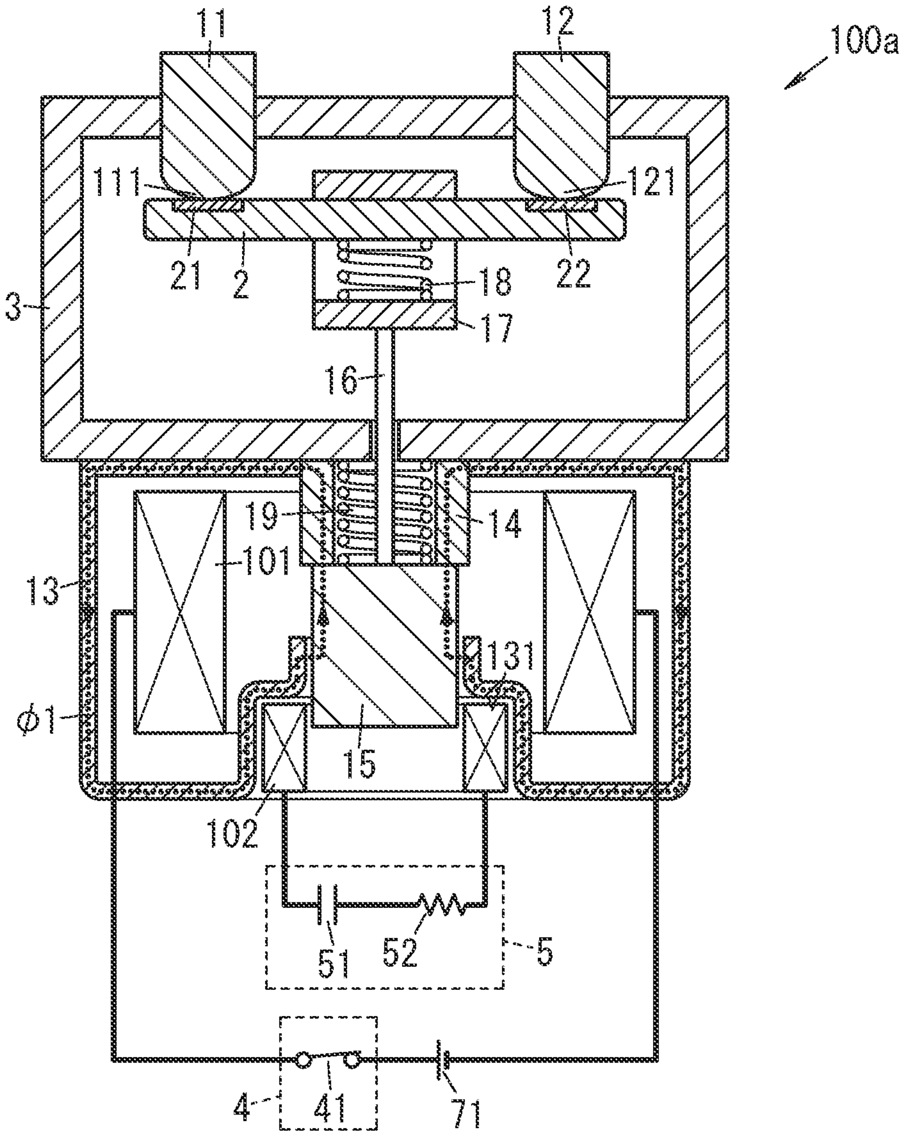
FIG. 8 is a cross-sectional view illustrating an ON state of the electromagnetic relay.

In the electromagnetic relay 100*a* according to a first variation, the second coil 102 is separated from the first coil 101 by a yoke 103 as shown in FIGS. 7 and 8, which is a major difference from the electromagnetic relay 100 according to the exemplary embodiment described above. Specifically, according to this variation, the yoke 103 has a recess 131, which forms a space surrounding the mover 15 at the first position and in which the second coil 102 is arranged. Thus, in this variation, the first coil 101 is arranged inside the space surrounded with the yoke 13, while the second coil 102 is arranged outside that space.

In this variation, when the first coil 101 is energized, the magnetic flux φ1 generated by the first coil 101 tends to pass as shown in FIG. 8 through the yoke 13 with smaller magnetic resistance than the space where the second coil 102 is arranged. That is to say, this variation reduces the chances of the magnetic flux φ1 generated by the first coil 101 being interlinked with the second coil 102, compared with the exemplary embodiment described above.

Figure 9:
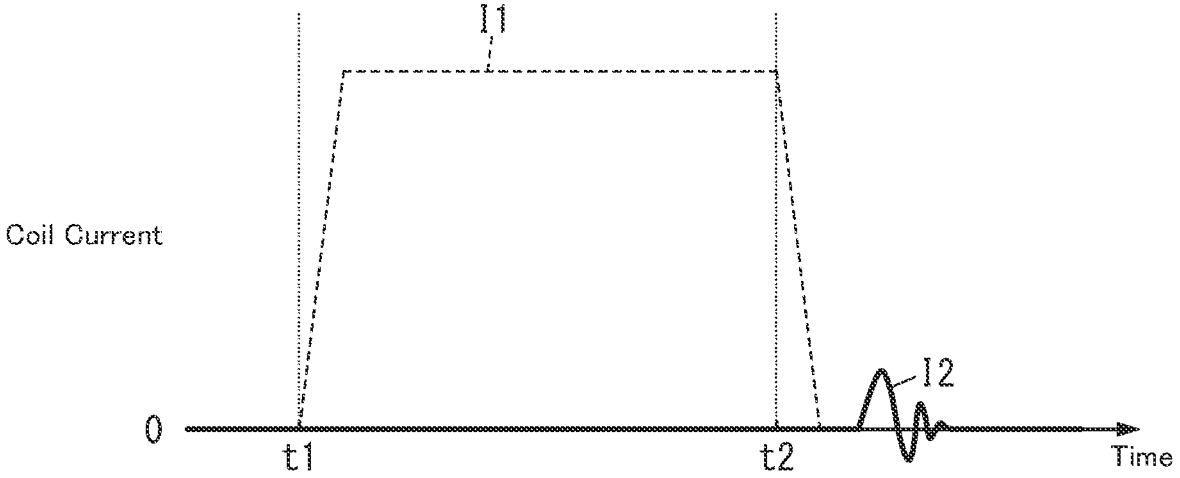
FIG. 9 illustrates how the electromagnetic relay operates.

Next, it will be described briefly with reference to FIG. 9 how the electromagnetic relay 100*a* according to this variation performs a demagnetization operation. First, when energized at a time t1, the first coil 101 generates a magnetic flux φ1. According to this variation, the magnetic flux φ1 generated by the first coil 101 is less likely to be interlinked with the second coil 102, and therefore, no or almost no induced current (second current) 12 flows through the second coil 102. Likewise, when the energized state of the first coil 101 is canceled at a time t2, the magnetic flux does not change, or hardly changes, at the second coil 102, and therefore, no or almost no induced current (second current) 12 flows through the second coil 102. Meanwhile, as the mover 15 with the remanent magnetization moves inside the second coil 102 at the time t2, an induced current (second current) 12 flows through the second coil 102. In this manner, a demagnetization operation is performed.

As can be seen, according to this variation, as the mover 15 with the remanent magnetization moves inside the second coil 102, an induced current (second current) 12 flows through the second coil 102. Thus, the second coil 102 is driven to reduce the remanent magnetization of the mover 15. Therefore, according to this variation, the magnetic attractive force hardly affects the movement of the mover 15. In addition, when the mover 15 has no remanent magnetization, the second coil 102 is less likely driven. Consequently, the electromagnetic relay 100*a* according to this variation achieves the advantage of reducing the remanent magnetization of the mover 15 more efficiently than the electromagnetic relay 100 according to the exemplary embodiment described above does.

(3.2) Second Variation

Figure 10:
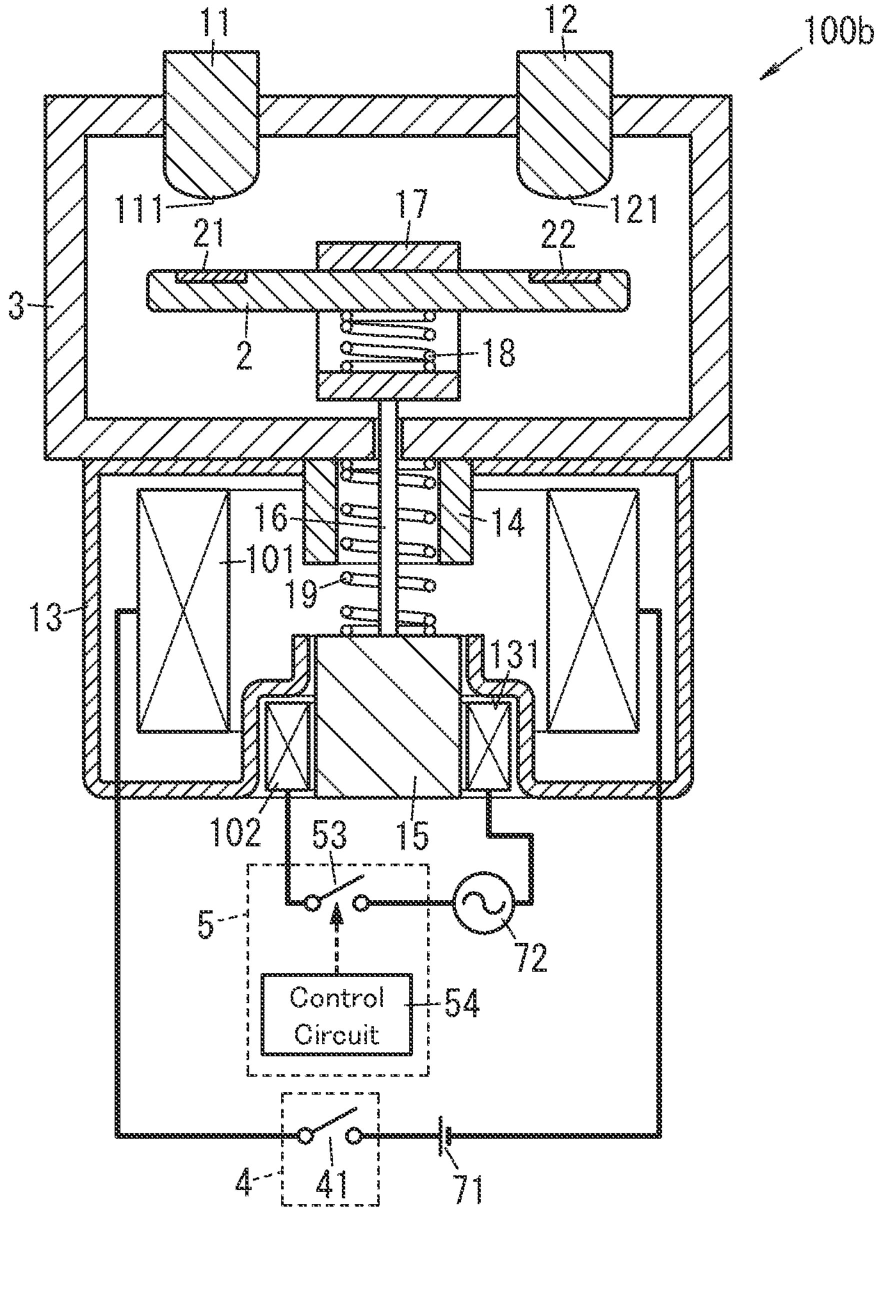
FIG. 10 is a cross-sectional view illustrating an OFF state of an electromagnetic relay according to a second variation of the exemplary embodiment of the present disclosure.

In an electromagnetic relay 100*b* according to a second variation, the demagnetization circuit 5 is made up of a second switch 53 and a control circuit 54 as shown in FIG. 10, instead of the series circuit of the capacitor 51 and the resistor 52, which is a major difference from the electromagnetic relay 100 according to the exemplary embodiment described above. The second switch 53 is provided on an electrical path connecting an AC power supply 72 to the second coil 102 to open and close the electrical path. The control circuit 54 controls the ON/OFF states of the second switch 53. The AC power supply 72 only needs to be configured to supply an alternating current to the second coil 102 and may include a DC power supply and an inverter circuit for receiving DC power from the DC power supply and outputting AC power. The alternating current output from the AC power supply 72 may have a sinusoidal wave or a rectangular wave, whichever is appropriate.

According to this variation, when the supply of a current to the first coil 101 is suspended, the control circuit 54 turns the second switch 53 ON. That is to say, according to this variation, a demagnetization operation is performed by supplying an alternating current to the second coil 102 while the first coil 101 is nonconductive. This implementation is realizable by having the control circuit 54 control the ON/OFF states of the second switch 53 in association with the ON/OFF states of the first switch 41 of the driver circuit 4. That is to say, the control circuit 54 may turn the second switch 53 ON while the first switch 41 is OFF and turn the second switch 53 OFF while the first switch 41 is ON.

As can be seen, according to this variation, turning the second switch 53 ON or OFF at an arbitrary timing using the control circuit 54 allows an alternating current to be supplied to the second coil 102 at the arbitrary timing. Thus, the electromagnetic relay 100*b* according to this variation achieves the advantage of reducing the remanent magnetization of the mover 15 at any timing. In addition, this variation also achieves the advantage of reducing the effect of the magnetic attractive force on the movement of the mover 15, compared to turning the second switch 53 ON while the first coil 101 is energized.

(3.3) Third Variation

Figure 11:
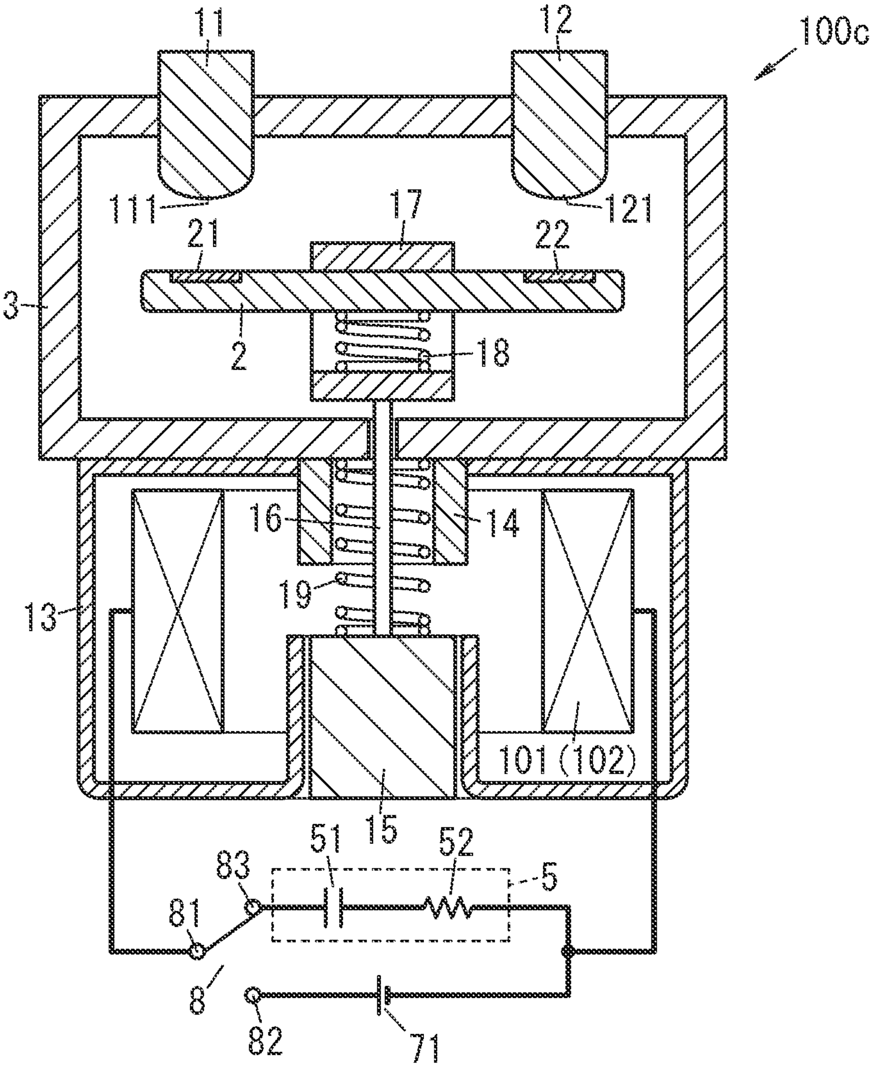
FIG. 11 is a cross-sectional view illustrating an OFF state of an electromagnetic relay according to a third variation of the exemplary embodiment of the present disclosure.

In an electromagnetic relay 100*c* according to a third variation, the first coil 101 also serves as the second coil 102 as shown in FIG. 11, which is a major difference from the electromagnetic relay 100 according to the exemplary embodiment described above. That is to say, the electromagnetic relay 100*c* according to this variation does not include the second coil 102 provided separately from the first coil 101. In this variation, the first coil 101 also serves as the second coil 102.

In this variation, the first switch 41 is replaced with a c-contact third switch 8. A common terminal 81 of the third switch 8 is electrically connected to one end of the first coil 101. A normally open terminal 82 of the third switch 8 is electrically connected to the cathode of the DC power supply 71 and a normally closed terminal 83 thereof is electrically connected to one terminal of the demagnetization circuit 5 (including the capacitor 51 and the resistor 52). The other terminal of the demagnetization circuit 5 and the anode of the DC power supply 71 are electrically connected to the other end of the first coil 101.

In this variation, while the first coil 101 is electrically nonconductive, the demagnetization circuit 5 is connected to the first coil 101. Connecting the first coil 101 to the DC power supply 71 by controlling the third switch 8 allows the first coil 101 to be switched from the electrically nonconductive state to an electrically conductive state. Thereafter, connecting the first coil 101 to the demagnetization circuit 5 again by controlling the third switch 8 allows the first coil 101 to be switched from the electrically conductive state to the electrically nonconductive state. At this time, if the mover 15 has remanent magnetization, the movement of the mover 15 with remanent magnetization inside the second coil 102 causes an induced current (second current) I2 to flow through the second coil 102, thus having a demagnetization operation performed.

As can be seen, the electromagnetic relay 100*c* according to this variation achieves the advantage of allowing a single coil to perform both the function of the first coil 101 and the function of the second coil 102.

(3.4) Other Variations

Next, other variations of the exemplary embodiment described above will be enumerated one after another. Note that the variations to be described below may be adopted in combination with the exemplary embodiment described above (including the first to third variations thereof) as appropriate.

In the exemplary embodiment described above, the demagnetization circuit 5 includes not only the capacitor 51 but also the resistor 52 as well. However, this is only an example of the present disclosure and should not be construed as limiting. That is to say, the demagnetization circuit 5 including only the capacitor 51 may still form a resonant circuit with the second coil 102, and therefore, may include no resistors 52.

In the exemplary embodiment described above, the demagnetization circuit 5 may be either built in, or provided as an external circuit for, the electromagnetic relay 100, whichever is appropriate.

In the first variation described above, the second coil 102 is separated by the yoke 13 from the first coil 101 and is magnetically independent of the first coil 101. However, this is only an example of the present disclosure and should not be construed as limiting. That is to say, the electromagnetic relay 100*a* may be configured to make the first coil 101 and the second coil 102 magnetically independent of each other by using a member other than the yoke 13.

In the second variation described above, the demagnetization circuit 5 is configured to supply an alternating current to the second coil 102 by being connected to the AC power supply 72. However, this is only an example of the present disclosure and should not be construed as limiting. Alternatively, the demagnetization circuit 5 may also be configured to supply a direct current to the second coil 102 by being connected to a DC power supply, for example.

According to the third variation described above, the demagnetization circuit 5 is implemented as a so-called “passive circuit” for reducing the remanent magnetization of the mover 15 by using an induced current generated by the movement of the mover 15 magnetized. However, this is only an example of the present disclosure and should not be construed as limiting. Alternatively, the demagnetization circuit 5 may also be implemented as a so-called “active circuit” for reducing the remanent magnetization of the mover 15 by using an alternating current actively supplied from the AC power supply 72 as in the second variation described above. This implementation is realizable by replacing the series circuit of the capacitor 51 and the resistor 52 with an AC power supply 72. In addition, according to this implementation, the demagnetization circuit 5 is made up of the third switch 8 and a control circuit for the third switch 8.

In the exemplary embodiment described above, the container 3 is configured to hold the fixed terminals 11, 12 with the fixed terminals 11, 12 partially exposed. However, this configuration is only an example and should not be construed as limiting. Alternatively, the container 3 may house the fixed terminals 11, 12 entirely inside itself. That is to say, the container 3 only needs to be configured to house the fixed contacts 111, 121 and the moving contactor 2 to say the least.

Furthermore, in the exemplary embodiment described above, the electromagnetic relay 100 is supposed to be a so-called “normally OFF” electromagnetic relay, of which the pair of moving contacts 21, 22 are located at the open position while the first coil 101 is not energized. However, this is only an example and should not be construed as limiting. Alternatively, the electromagnetic relay 100 may also be a normally ON electromagnetic relay.

Furthermore, in the exemplary embodiment described above, the number of moving contacts held by the moving contactor 2 is two. However, this is only an example and should not be construed as limiting. The number of the moving contacts held by the moving contactor 2 may also be one or even three or more. Likewise, the number of the fixed terminals (and fixed contacts) does not have to be two but may also be one or even three or more.

The electromagnetic relay 100 according to the exemplary embodiment described above includes the holder 17. However, this is only an example of the present disclosure and should not be construed as limiting. Alternatively, the electromagnetic relay 100 may have no holders. In that case, the moving contactor 2 is fixed at the upper end portion of the shaft 16. Also, the contact pressure spring 18 is arranged between the lower surface of the moving contactor 2 and the upper surface of the bottom wall of the container 3.

Furthermore, in the exemplary embodiment described above, the contact device 1 is implemented as a plunger type contact device. Alternatively, the contact device 1 may also be implemented as a hinged contact device.

(Resume)

As can be seen from the foregoing description, an electromagnetic relay (100, 100*a*, 100*b*, 100*c*) according to a first aspect includes a fixed contact (111, 121), a moving contact (21, 22), an electromagnet device (10), and a second coil (102). The moving contact (21, 22) moves from a closed position where the moving contact (21, 22) is in contact with the fixed contact (111, 121) to an open position where the moving contact (21, 22) is out of contact with the fixed contact (111, 121), and vice versa. The electromagnet device (10) includes a first coil (101) and a mover (15). The mover (15) is actuated on receiving a magnetic flux ($\varphi$1) generated when a current flows through the first coil (101) to move the moving contact (21, 22) from one of the closed position or the open position to the other position. The second coil (102) gives, when a current flows through the second coil (102), at least a magnetic flux, of which a direction is opposite from a direction of the magnetic flux ($\varphi$1) generated by the first coil (101), to the mover (15).

This aspect achieves the advantage of reducing the remanent magnetization of the mover (15).

An electromagnetic relay (100, 100*a*, 100*b*, 100*c*) according to a second aspect, which may be implemented in conjunction with the first aspect, further includes a demagnetization circuit (5) to supply an alternating current to the second coil (102).

This aspect allows the mover (15) to be placed in a magnetic field, of which the direction changes cyclically, thus achieving the advantage of facilitating reduction in the remanent magnetization of the mover (15).

In an electromagnetic relay (100, 100*a*, 100*c*) according to a third aspect, which may be implemented in conjunction with the second aspect, the demagnetization circuit (5) includes a capacitor (51) that forms a resonant circuit with the second coil (102).

This aspect achieves the advantage of reducing the remanent magnetization of the mover (15) without providing any power supply for supplying an alternating current.

In an electromagnetic relay (100*b*) according to a fourth aspect, which may be implemented in conjunction with the second aspect, the demagnetization circuit (5) includes a switch (second switch) (53) and a control circuit (54). The switch (53) opens and closes an electrical path connecting the second coil (102) to an AC power supply (72). The control circuit (54) controls ON/OFF states of the switch (53).

This aspect allows an alternating current to be supplied to the second coil (102) at an arbitrary timing, thus achieving the advantage of reducing the remanent magnetization of the mover (15) at an arbitrary timing.

In an electromagnetic relay (100*b*) according to a fifth aspect, which may be implemented in conjunction with the fourth aspect, the control circuit (54) turns the switch (53) ON when supply of a current to the first coil (101) is suspended.

This aspect achieves the advantage of reducing, compared to the case of turning the switch (53) ON when the first coil (101) is energized, the effect of magnetic attractive force on the movement of the mover (15).

An electromagnetic relay (100*a*, 100*b*) according to a sixth aspect, which may be implemented in conjunction with any one of the first to fifth aspects, further includes a yoke (13) to allow a magnetic flux (φ1) generated by the first coil (101) to pass therethrough. The second coil (102) is separated from the first coil (101) by the yoke (13).

This aspect reduces the chances of the magnetic flux (φ1) generated by the first coil (101) being interlinked with the second coil (102), thus achieving the advantage of reducing the effect of the magnetic attractive force on the movement of the mover (15).

In an electromagnetic relay (100, 100*a*, 100*b*) according to a seventh aspect, which may be implemented in conjunction with any one of the first to sixth aspects, the second coil (102) is provided separately from the first coil (101).

This aspect achieves the advantage of reducing the remanent magnetization of the mover (15) using a simpler configuration compared to using the first coil (101) as the second coil (102) as well.

Note that the constituent elements according to the second to seventh aspects are not essential constituent elements for the electromagnetic relay (100) but may be omitted as appropriate.

REFERENCE SIGNS LIST

111, 121 Fixed Contact
21, 22 Moving Contact
10 Electromagnet Device
101 First Coil
102 Second Coil
13 Yoke
15 Mover
5 Demagnetization Circuit
51 Capacitor
53 Second Switch (Switch)
54 Control Circuit
72 AC Power Supply
100, 100*a*, 100*b*, 100*c* Electromagnetic Relay
φ1 Magnetic Flux

The invention claimed is:

1. An electromagnetic relay comprising:
a fixed contact;
a moving contact configured to move from a closed position where the moving contact is in contact with the fixed contact to an open position where the moving contact is out of contact with the fixed contact, and vice versa;
an electromagnet device including:
a first coil and
a mover configured to be actuated on receiving a magnetic flux generated when a current flows through the first coil to move the moving contact from one of the closed position or the open position to the other position;
a second coil configured to give, when a current flows through the second coil, at least a magnetic flux, of which a direction is opposite from a direction of the magnetic flux generated by the first coil, to the mover; and
a yoke configured to allow a magnetic flux generated by the first coil to pass therethrough,
the second coil being separated from the first coil by the yoke,
the mover being configured to move between a first position and a second position,
the yoke having a recess which forms a space surrounding the mover when the mover is located at the first position, and
the second coil being arranged in the recess the mover is attached to a shaft with the second coil and at least part of the mover being positioned inside the recess, and with the first coil and at least part of the shaft being positioned outside the recess when the mover is located at the first position.

2. The electromagnetic relay of claim 1, further comprising a demagnetization circuit configured to supply an alternating current to the second coil.

3. The electromagnetic relay of claim 2, wherein
the demagnetization circuit includes a capacitor that forms a resonant circuit with the second coil.

* * * * *